Patented July 18, 1950

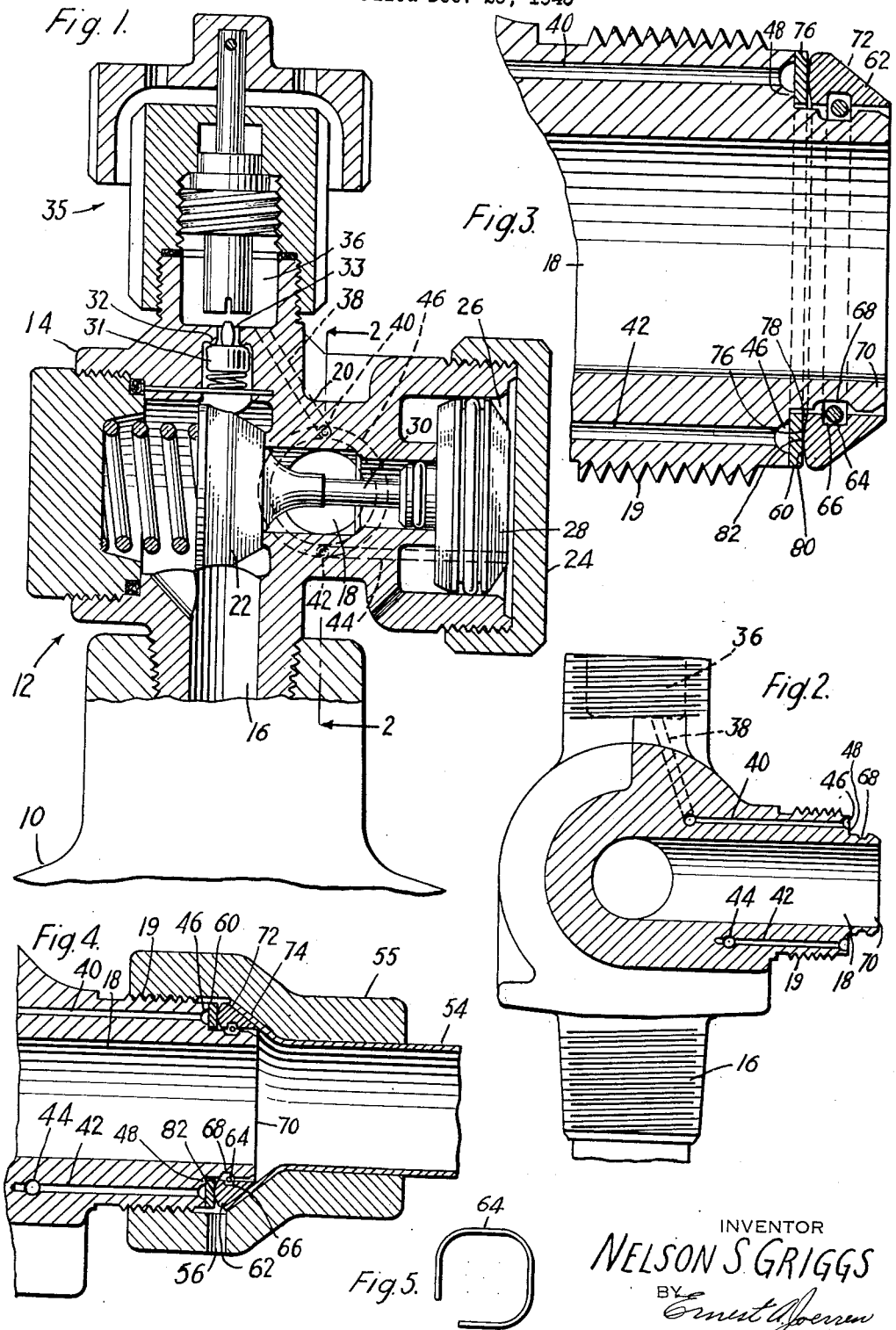

2,515,215

UNITED STATES PATENT OFFICE 2,515,215

COUPLING FOR VALVES AND THE LIKE

Nelson S. Griggs, Paterson, N. J., assignor to Specialties Development Corporation, Bloomfield, N. J., a corporation of New Jersey Application December 29, 1945, Serial No. 637,990

7 Claims. (Cl. 137—69)

The present invention relates to couplings for fluid pressure medium conduits, and particularly to couplings for valves and the like provided with means for controlling the flow of fluid through auxiliary ducts associated with the couplings and with means for effecting fluid discharge through the conduits.

An object of the present invention is to provide an improved coupling of the above-indicated type for interrupting the flow through the auxiliary duct means when the coupling elements are detached or only loosely connected.

Another object is to provide an improved recoil preventing device.

Another object is to provide cooperating coupling members, which are seated relative to each other in balanced relation irrespective of coupling forces which may tend to seat the members in unbalanced relation.

A further object is to provide couplings of the foregoing character, the elements of which are simple and inexpensive in construction, are readily assembled, and will not get out of working order or require replacement or repair.

Other and further objects, not specifically enumerated above, will be apparent as the invention is described in greater detail in connection with the accompanying drawing, wherein:

Figure 1 is a sectional view of a valve, embodying the invention, attached to a container for a high pressure fluid medium.

Figure 2 is a sectional view, taken substantially along the line 2—2 on Figure 1; the coupling elements for the outlet being omitted.

Figure 3 is an enlarged sectional view of the valve outlet with the coupling elements in position.

Figure 4 is a sectional view showing a discharge conduit coupled to the outlet.

Figure 5 is a detail view of a split ring for connecting certain elements of the coupling.

Referring to the drawing, and particularly to Figure 1, there is shown a container 10 for storing a high pressure fluid medium, such as carbon dioxide, and a discharge control valve 12 attached to the container.

The valve 12 shown is of the type illustrated in U. S. Patent No. 2,383,961 and generally comprises a body 14 provided with an inlet 16, an outlet 18, including a threaded nipple portion 19 (Figures 2 to 4), and a valve seat 20 between the inlet and the outlet for cooperation with a spring seated valve member 22. A cap 24 closes one end of a chamber or cylinder 26 containing a piston 28 operable by fluid medium for moving a stem 30 to unseat the valve member 22.

Operation of the piston 28 to unseat the valve member 22 is controlled by a pilot valve member 31 normally urged against a seat 32 surrounding a port 33 and adapted to be unseated by a pilot valve control head 35 attached to the valve body. Upon unseating of the pilot valve member 31, fluid medium is conducted to the piston chamber 26 by means of passageways about to be described.

A chamber portion 36 of the valve body, sealed by the control head 35, establishes communication between the pilot valve port 33 and a passageway or duct 38 (Figures 1 and 2) which meets a duct or passageway 40 extending longitudinally through the wall of the nipple portion 19. A second duct or passageway 42 extends longitudinally through the wall of the nipple portion and meets a duct or passageway 44 which extends into the piston chamber in back of the piston 28. The ducts 40 and 42 are adapted to be placed in fluid flow communication by an annular groove 46 formed in an annular shoulder 48 as described hereinafter, whereby the fluid flow circuit from the chamber 36 to the piston chamber 26 will be completed.

The fluid medium discharged through the outlet 18 is conducted to its point of use by a conduit 54 removably connected to the nipple portion 19 by a coupling nut 55 having a vent 56, the purpose of which will be described hereinafter. Means are provided at the free end of the nipple portion which cooperate with the coupling nut and the groove 46 to complete the aforementioned fluid flow circuit when the coupling nut is properly secured.

In accordance with the present invention, these means (Figures 3 and 4) comprise an annular member, such as a slightly deformable resilient flat metal ring 60, adapted to seat on the shoulder 48 and extend across the groove 46 to confine the groove and provide a fluid flow passage. A second annular member 62 is mounted over the ring 60 and is movably retained by a split ring 64 disposed in an annular groove 66 in the inner wall of the member 62 and an annular groove 68 in the outer wall of the reduced free end 70 of the nipple, whereby the ring 60 is retained on the nipple portion.

The split ring 64, as shown in Figure 5, has a generally square shape and this ring, when fitted between the grooves 66 and 68, is adapted to engage both the member 62 and the nipple with sufficient friction to hold the member 62 in seating position during shipment of the valve, whereby the entry of foreign matter into the groove 46 and ducts 40 and 42 is prevented.

The second annular member 62 has an inclined or tapered outer wall 72 which provides a seat for the flared end 74 of the conduit 54 and, upon securement of the coupling nut, serves to wedge the member 62 towards the ring 60. The member 62 has an end face 76 for engaging the outer side of the ring 60 to securely hold the ring on its seat and to render the passage thus provided by the groove 46 fluid pressure tight. As shown herein, the end face may have inner and outer annular sloping portions 78 and 80, respectively providing an annular apex portion 82 which contacts the ring 60 at a zone overlying the groove 46.

When the coupling nut is secured, the annular apex portion applies pressures to the ring 60 between its inner and outer periphery. This causes the ring 60 to be slightly bowed into the groove 64 and bear with uniform pressure against portions of its seat at the inner and outer periphery of the groove 46, to effect balanced seating of the ring and securely seal the groove to convert the same to a passage for establishing fluid flow communication between the ducts 40 and 42.

In operation, with the coupling nut secured as shown in Figure 4, the control head 35 is operated to unseat the pilot valve member 31 whereby fluid is conducted from the container to the piston chamber 26 by way of the port 33, the chamber 36, the ducts 38 and 40, the groove 46, and the ducts 42 and 44. This causes the piston 28 to be actuated to unseat the main valve member 22, whereby the fluid medium is discharged from the container through the outlet 18 into the conduit 54.

If the control head 35 is inadvertently operated when the conduit 54 and the coupling nut 55 are detached, the piston operating fluid does not reach the piston chamber, but is discharged to the atmosphere through the duct 40. Consequently main discharge of the fluid will not occur, and the contingency of recoil of the container is eliminated.

If the control head 35 is inadvertently operated when the nut 55 is only loosely applied to the nipple portion, the piston operating fluid is discharged into the interior of the nut adjacent the free end of the nipple and is bled to the atmosphere by the vent 56, whereby main discharge will not occur.

From the foregoing description, it will be seen that the present invention provides an improved coupling of the type indicated. The elements of the coupling are simple and inexpensive in construction, and are readily manufactured and assembled. The improved arrangement of elements for completing the piston operating fluid flow circuit prevents leakage tending to cause faulty operation of the piston. The coupling is rugged in construction and can readily withstand any rough usage to which it may be subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention, which, as a matter of language, might be said to fall therebetween.

I claim:

1. The combination of a conduit element including attaching means and an annular shoulder and a tubular end length extension of the element radially inwardly of said shoulder having an outer perimetral groove intermediate its ends, annular means around said extension including an inner end element next to said shoulder and an outer-end length having an inner perimetral groove intermediate its ends radially opposite said extension groove, means in said grooves locking said annular means to said extension, and coupling means cooperating with said attaching means for clamping a conduit against said annular means.

2. The combination of a conduit element including attaching means and an annular radial shoulder and a tubular end length extension of the element radially inwardly of said shoulder, said conduit element having a duct opening through said shoulder, a closure member on said shoulder for said duct, an annular member around said extension having an inner end next to said closure member for holding the latter closed and an outer-end length having a longitudinally-outwardly, radially-inwardly sloping outer surface, and coupling means cooperating with said attaching means for clamping a conduit against said sloping surface and said inner end against said closure member.

3. In a valve of the class described, the combination of an outlet conduit having an annular shoulder provided with a groove and having a pair of passageways communicating with said groove, an annular member adapted to seat on said shoulder to confine said groove and establish a fluid flow connection between said passageways, and a second annular member having an end face provided with an apex portion for engaging said first annular member in overlying relation with respect to said groove, whereby balanced seating of said first annular member on each side of said groove is effected.

4. In a valve of the class described the combination of outlet means having an annular shoulder provided with an annular groove and having a pair of passageways communicating with said groove, an annular member adapted to seat on said shoulder to confine said groove and establish a fluid flow connection between said passageways, a second annular member having an inclined wall and having a face provided with an annular apex portion arranged for engaging said first annular member in alignment with respect to said groove whereby to apply a force on said first annular member to uniformly seal said groove at its inner and outer periphery, and means for movably retaining second annular member on said outlet means.

5. In combination, an outlet conduit having a reduced end portion, an annular shoulder adjacent said end portion provided with a groove and a pair of passageways communicating with said groove; an annular member extending about said end portion for movement thereon and adapted to seat on said shoulder to confine said groove and establish a fluid flow connection between said passageways; a second annular member having an end face for engaging said first annular member in overlying relation with respect to said groove; and means for movably retaining said second annular member on said reduced end portion to thereby mount said first annular member on said end portion for movement between said end face and said shoulder.

6. In a valve of the class described, the combination of an outlet conduit having a shoulder provided with an annular surface and a pair of passageways terminating at said surface, an annular member adapted to seat on said shoulder having an annular surface, one of said annular surfaces having an annular groove therein and said other annular surface cooperating therewith to confine said groove and establish a fluid flow connection between said passageways, and a second annular member having an end face provided with an apex portion for engaging said first annular member in overlying relation with respect to said groove, whereby balanced seating of said first annular member on each side of said groove is effected.

7. In combination, an outlet conduit having a reduced end portion, a shoulder adjacent said end portion provided with an annular surface and a pair of passageways terminating at said surface; an annular member extending about said end portion for movement thereon and adapted to seat on said shoulder, said member having an annular surface, one of said annular surfaces having an annular groove therein and said other annular surface cooperating therewith to confine said groove and establish a fluid flow connection between said passageways; a second annular member having an end face for engaging said first annular member in overlying relation with respect to said groove; and means for movably retaining said second annular member on said reduced end portion to thereby mount said first annular member on said end portion for movement between said end face and said shoulder.

NELSON S. GRIGGS.

REFERENCES CITED

The following references are of record in the file of this patent:

UNITED STATES PATENTS

| Number | Name | Date |
| --- | --- | --- |
| 2,418,817 | Cantlin | Apr. 15, 1947 |